United States Patent
Plessner et al.

(10) Patent No.: US 9,663,233 B2
(45) Date of Patent: May 30, 2017

(54) VENTILATION CONDUIT FOR AN AIRCRAFT

(71) Applicant: The Boeing Company, Chicago, IL (US)

(72) Inventors: Julie K. Plessner, Poulsbo, WA (US); Douglas D. Maben, Snohomish, WA (US); Daniel F. Lewinski, Stanwood, WA (US); George A. McEachen, Mukilteo, WA (US); Mark E. Smith, Renton, WA (US); Michael L. Trent, Everett, WA (US); Richard K. Johnson, Camano Island, WA (US)

(73) Assignee: The Boeing Company, Chicago, IL (US)

( * ) Notice: Subject to any disclaimer, the term of this patent is extended or adjusted under 35 U.S.C. 154(b) by 487 days.

(21) Appl. No.: 14/188,603

(22) Filed: Feb. 24, 2014

(65) Prior Publication Data

US 2014/0242896 A1    Aug. 28, 2014

Related U.S. Application Data

(60) Provisional application No. 61/769,110, filed on Feb. 25, 2013.

(51) Int. Cl.
| | |
|---|---|
| *B64D 13/00* | (2006.01) |
| *B64D 15/04* | (2006.01) |
| *B64D 1/16* | (2006.01) |
| *B64D 33/04* | (2006.01) |
| *B64C 1/14* | (2006.01) |
| *F16L 25/02* | (2006.01) |
| *B64D 41/00* | (2006.01) |

(52) U.S. Cl.
CPC ............ *B64D 13/00* (2013.01); *B64C 1/1453* (2013.01); *F16L 25/026* (2013.01); *B64D 41/00* (2013.01)

(58) Field of Classification Search
None
See application file for complete search history.

(56) References Cited

U.S. PATENT DOCUMENTS

| | | | | |
|---|---|---|---|---|
| 2,207,242 | A |   | 6/1937 | Seversky |
| 2,283,045 | A | * | 5/1942 | Carbonara ............. G01P 5/165 205/73 |
| 2,393,593 | A | * | 1/1946 | Daiber ................... G01P 5/165 219/201 |
| 3,210,095 | A | * | 10/1965 | Elliott ................. F16L 58/1027 285/148.19 |
| 5,290,996 | A | * | 3/1994 | Giamati ................ B64C 1/1453 219/201 |

(Continued)

FOREIGN PATENT DOCUMENTS

| | | |
|---|---|---|
| EP | 0 205 283 A1 | 12/1986 |
| EP | 0654402 A1 | 5/1995 |
| WO | 2011018381 A2 | 2/2011 |

*Primary Examiner* — Gregory Huson
*Assistant Examiner* — Eric Gorman
(74) *Attorney, Agent, or Firm* — Miller, Matthias & Hull LLP

(57) ABSTRACT

An aircraft comprises composite skin having an opening, and a ventilation conduit having an end portion that extends to the opening in the composite skin. The conduit is made of metal except for the end portion, which functions as an electrical insulator.

18 Claims, 6 Drawing Sheets

(56) References Cited

U.S. PATENT DOCUMENTS

| | | | | |
|---|---|---|---|---|
| 5,655,732 | A | * | 8/1997 | Frank .................... B64C 1/1453 239/171 |
| 6,211,494 | B1 | | 4/2001 | Giamati et al. |
| 6,435,452 | B1 | * | 8/2002 | Jones .................... B64C 1/1453 244/1 A |
| 6,779,269 | B2 | * | 8/2004 | Green .................... F16L 35/00 285/114 |
| 8,857,768 | B2 | * | 10/2014 | Giamati ................ B64C 1/1453 244/136 |
| 9,315,253 | B2 | * | 4/2016 | Lee ........................ B64C 1/1453 |
| 2002/0014771 | A1 | * | 2/2002 | Gotoh ................... F16L 13/103 285/371 |
| 2002/0056789 | A1 | * | 5/2002 | Jones ................... B64C 1/1453 244/129.1 |
| 2002/0145851 | A1 | * | 10/2002 | Manno ............... H05K 7/20145 361/679.48 |
| 2008/0041084 | A1 | * | 2/2008 | Minami ............. B60H 1/00571 62/244 |
| 2012/0231306 | A1 | | 9/2012 | Herron et al. |
| 2013/0181445 | A1 | * | 7/2013 | Glime ................... F16L 15/04 285/337 |
| 2014/0242424 | A1 | * | 8/2014 | Jones .................. H01M 10/658 429/54 |
| 2014/0272479 | A1 | * | 9/2014 | Turbe ................. H01M 2/1241 429/50 |
| 2015/0090360 | A1 | * | 4/2015 | Carlay, II ............ F24F 13/0263 138/149 |

* cited by examiner

VENTILATION CONDUIT FOR AN AIRCRAFT

This application claims the benefit of provisional application U.S. Ser. No. 61/769,110 filed 25 Feb. 2013, which is incorporated herein by reference.

BACKGROUND

Lithium-ion batteries (LIBs) are desirable for mobile computing devices, certain automobiles, and certain aircraft. They have lower weight and higher energy density than rechargeable batteries such as nickel metal hydride and nickel cadmium batteries. They have no memory degradation.

However, certain lithium-ion batteries have longstanding issues with failure events that result in the generation of hot gas. One solution is to vent the gas. While this solution might seem straightforward for rechargeable battery applications in a mobile device or an automobile, it is not straightforward for an aircraft having composite skin.

SUMMARY

According to an embodiment herein, an aircraft comprises composite skin having an opening, and a ventilation conduit having an end portion that extends to the opening in the composite skin. The conduit is made of metal except for the end portion, which functions as an electrical insulator.

According to another embodiment herein, an aircraft comprises a fuselage including composite skin, an enclosure within the fuselage, and a ventilation conduit extending from the enclosure to an opening in the composite skin. The conduit includes a metal portion having a first end coupled to the enclosure, and an electrically non-conductive portion coupled between the composite skin and a second end of the metal portion.

According to another embodiment herein, an aircraft system comprises an aircraft enclosure, and a ventilation conduit for removing gas from the enclosure. The ventilation conduit includes a metal portion having a first end coupled to the enclosure, an electrically non-conductive tube having a first end coupled to a second end of the metal portion, and a flange fitting attached to a second end of the non-conductive tube. The flange fitting is configured to penetrate composite aircraft skin.

These features and functions may be achieved independently in various embodiments or may be combined in other embodiments. Further details of the embodiments can be seen with reference to the following description and drawings.

DETAILED DESCRIPTION

Figure 1:
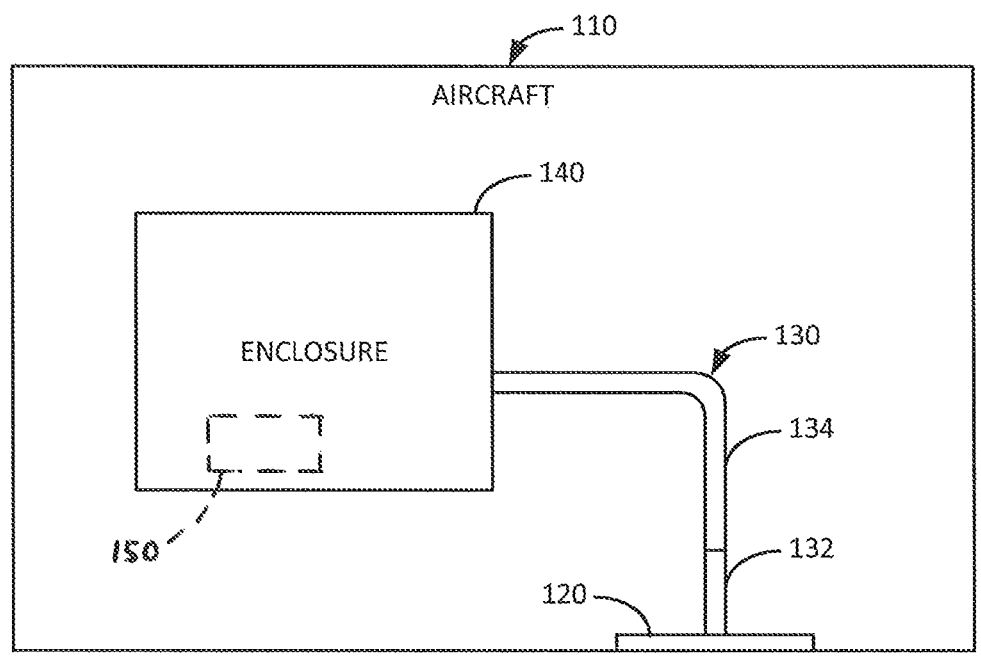
FIG. 1 is an illustration of an aircraft including an enclosure and a ventilation conduit for the enclosure.

Reference is made to FIG. 1, which illustrates an aircraft 110. The aircraft 110 includes a fuselage, wing assemblies, and empennage (not shown). Each of these major components includes skin supported by a stiffening substructure (e.g., frames, stiffeners). At least one of the fuselage, wing assemblies and empennage includes composite skin 120. In some embodiments, the composite skin 120 may include a fiber-reinforced material such as carbon fiber reinforced plastic (CFRP).

The composite skin 120 has an exterior surface that is aerodynamically smooth. The exterior surface of the composite skin 120 may be covered with a glass epoxy surface layer and paint system. Some portions of the exterior surface of the composite skin 120 may be covered by a fairing having an exterior surface that is aerodynamically smooth.

The aircraft 110 further includes a ventilation system including a ventilation conduit 130. The conduit 130 has an end portion 132 that extends to an opening in the composite skin 120. The end portion 132 of the ventilation conduit 130 is secured to the composite skin 120. The ventilation conduit 130 may be made entirely of metal, except for the end portion 132, which functions as an electrical insulator.

For example, a metal portion 134 of the ventilation conduit 130 is made of a lightweight, corrosion-resistant metal, such as titanium or corrosion resistant steel (CRES). The end portion 132 may be made of an electrically non-conductive material that satisfies thermal requirements of the ventilation system.

The ventilation conduit 130 overcomes a problem that is particular to the aircraft 110. The end portion 132 provides protection against lightning strike current or other current due to electromagnetic effect (EME). Because the end portion 132 is non-conductive, it prevents electrical current from entering inside the aircraft 110.

Figure 2A:
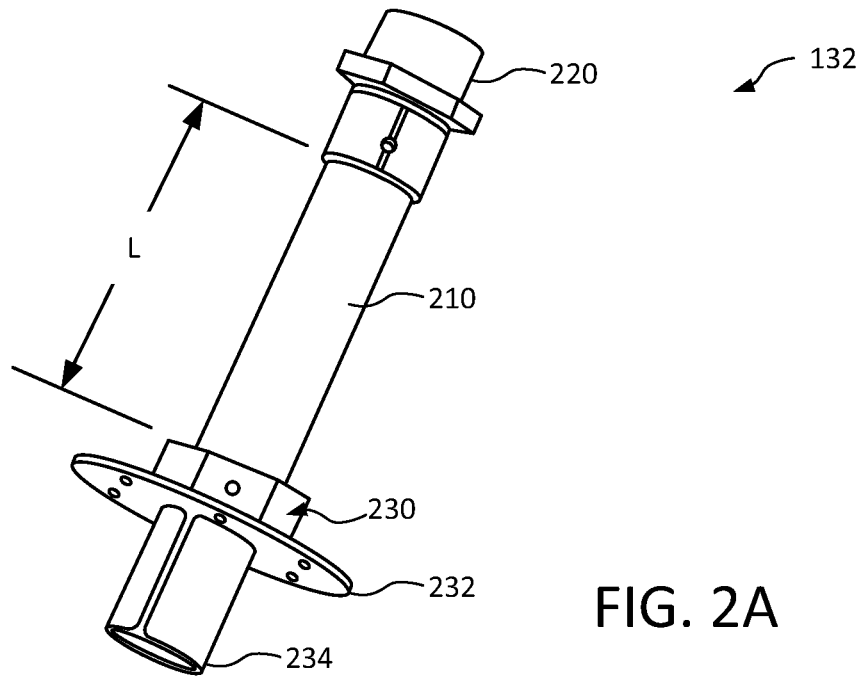
FIG. 2A is an illustration of an end portion of a ventilation conduit.

FIG. 2A illustrates an example of the end portion 132 of the ventilation conduit 130. The end portion 132 includes a tube 210, and a connector fitting 220 secured (e.g., bonded and riveted) to one end of the tube 210. The connector fitting 220 has internal threads for engaging threads on the metal portion 134 of the ventilation conduit 130.

The end portion 132 also includes a flange fitting 230 secured (e.g., bonded and riveted) to the other end of the tube 210. The flange fitting 230 is configured to mount the tube 210 to the composite skin 120. The flange fitting 230 may include a flange 232 and a tubular portion 234 that extends beyond the flange 232. This tubular portion 234 extends into the opening in the composite skin 120.

The tube 210 is made of an electrically non-conductive material. Examples of the electrically non-conductive material include thermoplastic, and a composite with fiberglass, aramid or other nonconductive fiber. Length (L) of the tube 210 may be at least two inches to provide adequate electrical isolation against lightning strike or other electrical current.

The connector fitting 220 and the flange fitting 230 may also be made of an electrically non-conductive material.

Figure 3:
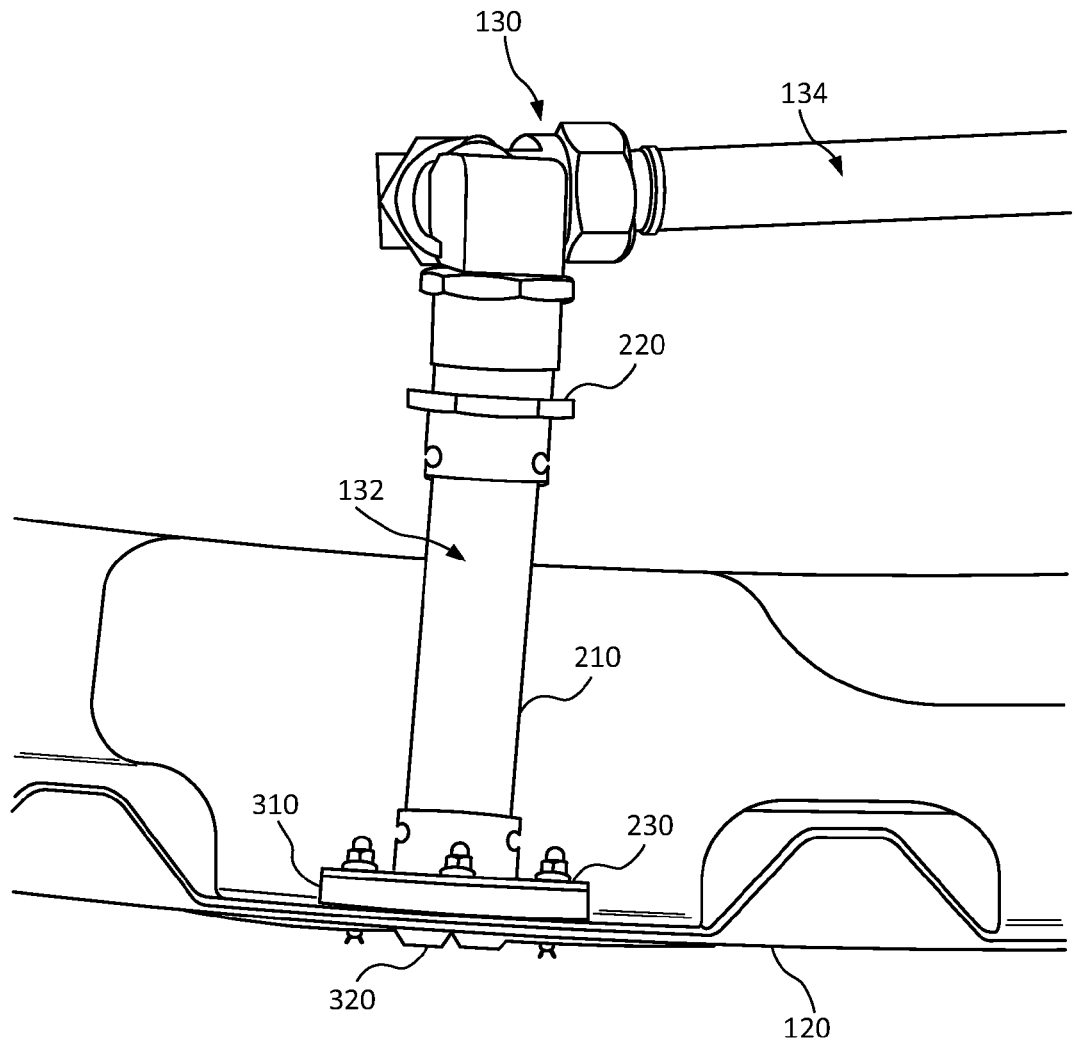
FIG. 3 is an illustration of a ventilation conduit.

Reference is now made to FIG. 3, which illustrates an example of a ventilation conduit 130 having a metal portion 134 and an end portion 132. The end portion 132 of the ventilation conduit 130 includes the tube 210, the connector fitting 220, and the flange fitting 230. The metal portion 134 of the ventilation conduit 130 is threaded onto the connector fitting 220, and the flange fitting 230 is fastened to composite skin 120. The tubular portion (not visible in FIG. 3) of the flange fitting 230 extends through an opening in the composite skin 120.

In some embodiments, a thermal spacer 310 may be located between the flange 232 and the composite skin 120 and also in the opening of the composite skin 120 to create a thermal barrier between the end portion 132 and the composite skin 120. The thermal spacer 310 mitigates heat transfer directly to the composite skin 120 and thereby prevents hot gases from damaging the composite skin 120 as the gases are being vented overboard the aircraft 110.

Figure 2B:
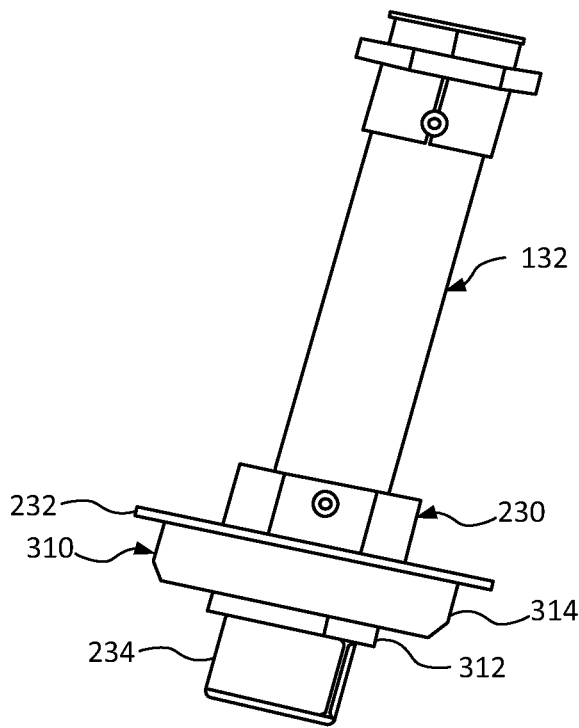
FIG. 2B is an illustration of an end portion of a ventilation conduit and a thermal spacer mounted to the end portion.

Additional reference is made to FIG. 2B, which illustrates the thermal spacer 310 mounted to the flange fitting 230 of the end portion 132. The thermal spacer 310 includes a first portion 312 that is configured to fit into the opening and also to surround the tubular portion 234 of the flange fitting 230. The thermal spacer 310 includes a larger second portion 314 that is configured to sit between the flange 232 and the composite skin 120. The thermal spacer 310 may be made of Polyether ether ketone (PEEK) thermoplastic or other thermoplastic or composite that meets the thermal requirements of the ventilation system.

Figure 4:
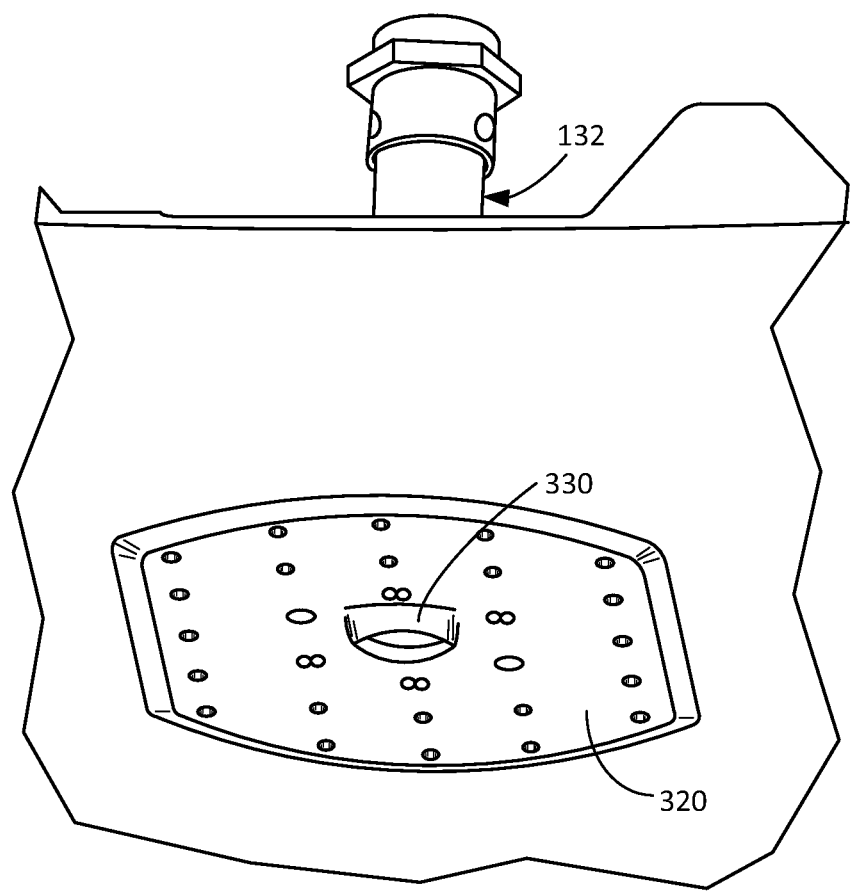
FIG. 4 is an illustration of a doubler plate for a ventilation conduit.

Additional reference is made to FIG. 4. In some embodiments, a doubler plate 320 may be mounted to the exterior surface of the composite skin 120. The doubler plate 320 may be fastened to the flange fitting 230 (as shown in FIG. 3). An opening in the doubler plate 320 receives the tubular portion 234 of the flange fitting 230. The doubler plate 320 provides structural reinforcement about the opening in the composite skin 120, and it protects the composite skin 120 against possible thermal damage from gas exiting the ventilation conduit 130. The doubler plate 320 may be made of a material such as titanium or corrosion resistant steel.

The doubler plate 320 may have a slight protrusion 330 around the opening in the skin 120 around the tubular portion 234 of the flange fitting 230 to mitigate noise. The protrusion 330 is sufficient to reduce noise of airstream passing over the opening in the composite skin 120 during flight.

Returning to FIG. 1, the ventilation conduit 130 is not limited to any particular ventilation system aboard the aircraft 110. In general, the ventilation system allows gas to be vented from an enclosure 140 (via the ventilation conduit 130) and exhausted overboard the aircraft 110. One example of the enclosure 140 is a fuel tank. Another example of the enclosure 140 is a metal enclosure for a rechargeable battery 150.

Figure 5:
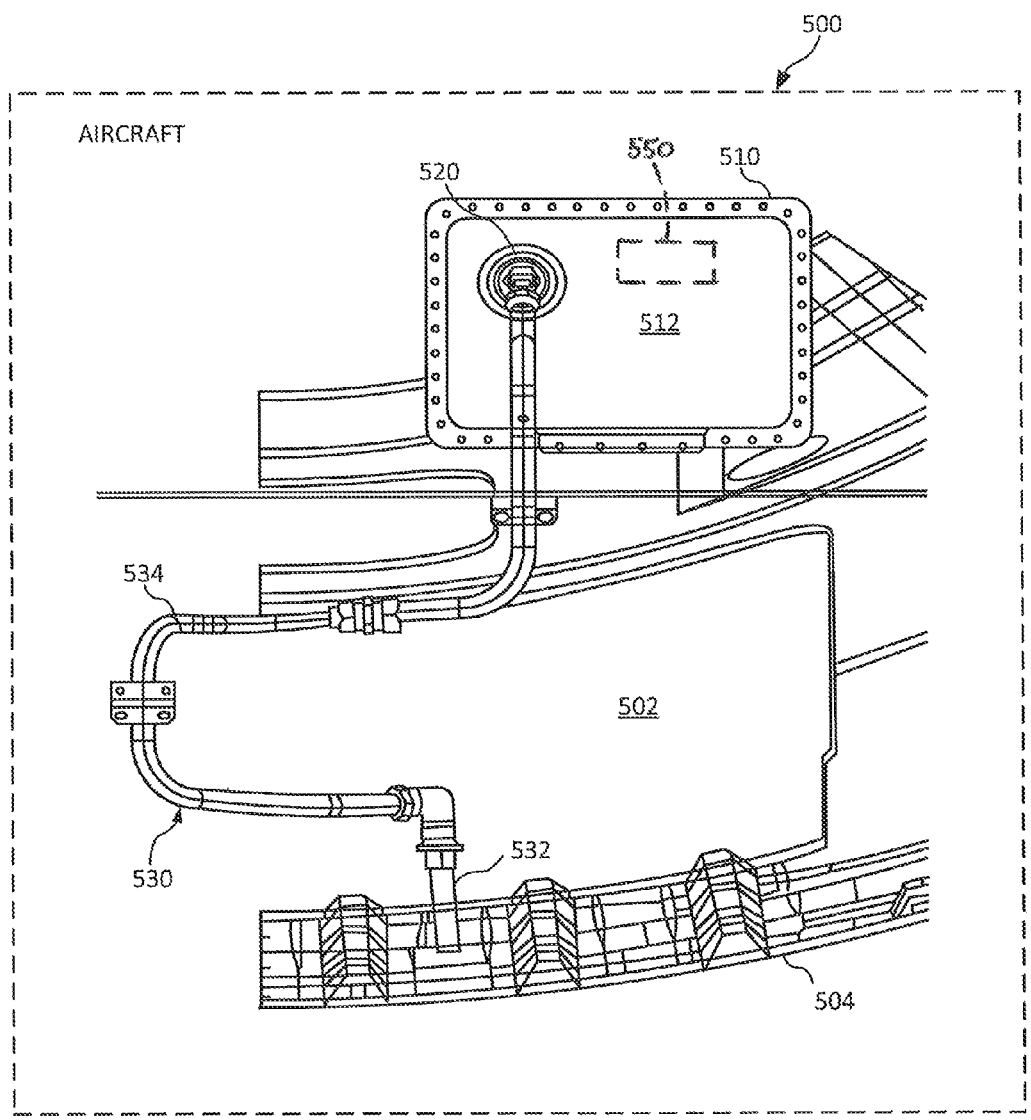
FIG. 5 is an illustration of a ventilation system for a rechargeable battery of an aircraft.

Reference is made to FIG. 5, which illustrates an enclosure 510 for a rechargeable battery 550 aboard an aircraft 500. The enclosure 510 may be located in the fuselage 502 of the aircraft 500.

If a battery failure event occurs, the battery may generate hot gas. The enclosure 510 contains the gas.

FIG. 5 also illustrates a ventilation system for the enclosure 510. The ventilation system includes a ventilation conduit 530 and a vent valve 520. The vent valve 520 is located at an opening in a wall 512 of the enclosure 510. The ventilation conduit 530 extends from the vent valve 520 to composite skin 504 of the fuselage 502. The vent valve 520 is normally closed to prevent the battery environment inside the enclosure 510 from cycling with ambient airplane pressures between takeoff and cruise altitudes (e.g., sea level and 40,000 feet). Such cycling can decrease the life of the battery.

A metal portion 534 of the ventilation conduit 530 has a first end attached to the vent valve 520. An end portion 532 of the ventilation conduit 530 is coupled between the metal portion 534 and the composite skin 504 of the fuselage 502. The end portion 532 of FIG. 5 may have the same or similar construction as the end portion 132 of FIG. 2.

If a battery failure event generates hot gas that causes pressure within the enclosure 510 to exceed a design limit, the vent valve 520 opens, and the hot gas is vented out of the enclosure 510, through the ventilation conduit 530, and exhausted overboard the aircraft 500.

In some embodiments, the vent valve 520 may be actively sensed and controlled (e.g., with a pressure sensor, ball valve, and actuator). In other embodiments, the vent valve 520 may be a passive valve (e.g., a spring loaded poppet valve, rupturable diaphragm).

Figure 6:
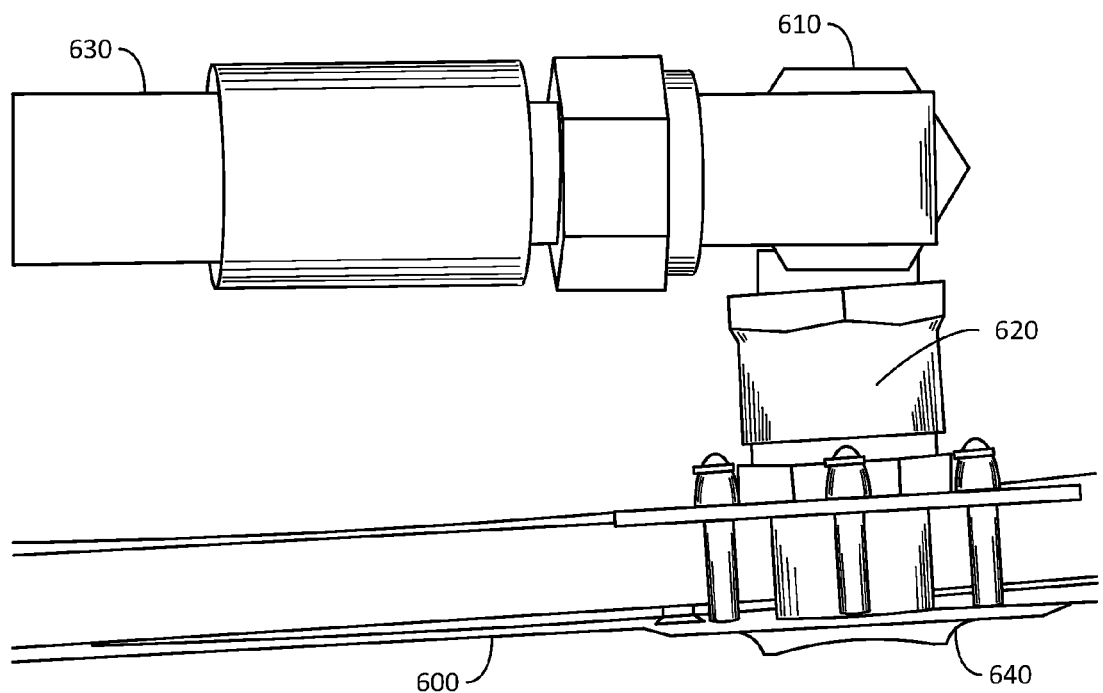
FIG. 6 is an illustration of an extension of a ventilation conduit between skin and a fairing of an aircraft.

Reference is now made to FIG. 6, which illustrates a fairing 600 on an exterior surface of the composite skin (not shown in FIG. 6). A ventilation conduit includes the end portion 132 of FIG. 2 (not shown in FIG. 6), which penetrates the composite skin.

FIG. 6 also illustrates an extension 610 of the ventilation conduit between the composite skin and the fairing 600. The extension 610 may include a second conduit 620 that penetrates the fairing 600. The second conduit 620 may be electrically conductive or non-conductive. A flexible hose 630 connects the second conduit 620 to the end portion at the composite skin. The flexible hose 630 supports flexure of the second conduit 620. A doubler plate 640 may be attached to the exterior surface of the fairing 600 over the second conduit 620.

Figure 7:
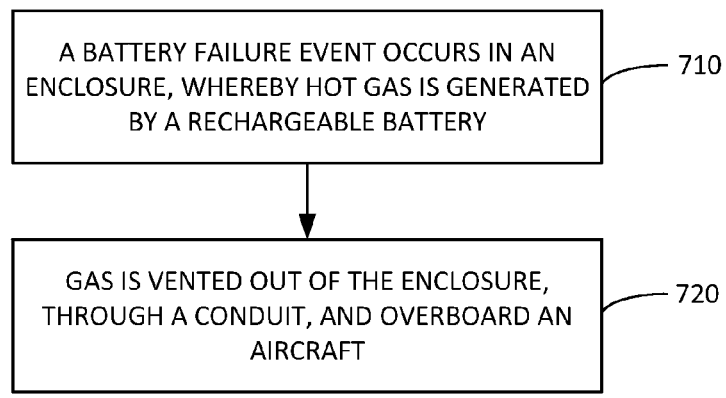
FIG. 7 is an illustration of a method of mitigating consequences of a battery failure event aboard an aircraft.

Reference is now made to FIG. 7, which a method of using the ventilation system to mitigate the consequences of a battery failure event aboard an aircraft having a rechargeable battery within an enclosure. At block 710, a battery failure event occurs, whereby hot gas is generated by the battery. The hot gas causes pressure in the enclosure to rise.

At block 720, the pressure causes the vent valve to open. Gas is vented out of the enclosure, through the conduit, and overboard the aircraft. The thermal spacer and the doubler plate prevent the hot gas from damaging the composite aircraft skin. As gas in the enclosure is being vented, pressure within the enclosure is reduced.

If, during flight, lightning current or other current attaches to the doubler plate, the end portion of the conduit will prevent the current from entering into the aircraft.

The invention claimed is:

1. An aircraft comprising:
a fuselage including composite skin;
an enclosure located inside the fuselage;
a rechargeable battery disposed inside the enclosure; and
a ventilation conduit extending from the enclosure to an opening in the composite skin, the conduit including:
a metal portion having a first end coupled to the enclosure and a second end spaced from the composite skin, and
an electrically non-conductive portion coupled between the composite skin and the second end of the metal portion.

2. The aircraft of claim 1, wherein the electrically non-conductive portion includes:
an electrically non-conductive tube having a first end coupled to the second end of the metal portion; and
a flange fitting attached to a second end of the non-conductive tube, the flange fitting having a portion that extends into the opening in the composite skin.

3. The aircraft of claim 2, wherein the electrically non-conductive tube is made of one of a thermoplastic, a fiberglass composite, and an aramid composite.

4. The aircraft of claim 2, further comprising a thermal spacer located between the flange fitting and the composite skin.

5. The aircraft of claim 1, further comprising a doubler plate on an exterior surface of the composite skin, over the opening in the composite skin.

6. The aircraft of claim 5, wherein the doubler plate has a protrusion around the opening in the composite skin.

7. The aircraft of claim 1, wherein the composite skin is made of a carbon fiber-reinforced plastic (CFRP).

8. The aircraft of claim 1, wherein the electrically non-conductive portion has a length of at least two inches.

9. The aircraft of claim 1, wherein the electrically non-conductive portion is formed of at least one of a thermoplastic, a fiberglass composite, and an aramid fiber.

10. The aircraft of claim 1, further comprising:
a fairing on an exterior surface of the composite skin;
a second conduit that penetrates the fairing; and
a flexible hose that connects the second conduit to the electrically non-conductive portion at the composite skin.

11. The aircraft of claim 1, further comprising a normally closed vent valve that couples the metal portion of the conduit to the enclosure.

12. An aircraft comprising:
a fuselage including composite skin;
an enclosure located inside the fuselage;
a rechargeable battery disposed inside the enclosure;
a ventilation conduit extending from the enclosure to an opening in the composite skin, the conduit including:
  a metal portion having a first end coupled to the enclosure and a second end spaced from the composite skin;
  an electrically non-conductive portion coupled between the composite skin and the second end of the metal portion; and
  a flange fitting attached to a second end of the non-conductive tube, the flange fitting having a portion that extends into the opening in the composite skin; and
a thermal spacer located between the flange fitting and the composite skin.

13. The aircraft of claim 12, wherein the electrically non-conductive tube is made of one of a thermoplastic, a fiberglass composite, and an aramid composite.

14. The aircraft of claim 12, further comprising a doubler plate on an exterior surface of the composite skin, over the opening in the composite skin.

15. The aircraft of claim 12, further comprising:
a fairing on an exterior surface of the composite skin;
a second conduit that penetrates the fairing; and
a flexible hose that connects the second conduit to the electrically non-conductive portion at the composite skin.

16. The aircraft of claim 12, further comprising a normally closed vent valve that couples the metal portion of the conduit to the enclosure.

17. The aircraft of claim 10, wherein the electrically non-conductive portion includes:
an electrically non-conductive tube having a first end coupled to the second end of the metal portion; and
a flange fitting attached to a second end of the non-conductive tube, the flange fitting having a portion that extends into the opening in the composite skin.

18. The aircraft of claim 17, wherein the electrically non-conductive tube is made of one of a thermoplastic, a fiberglass composite, and an aramid composite.

* * * * *